(12) United States Patent  (10) Patent No.: US 6,695,375 B1
May  (45) Date of Patent: Feb. 24, 2004

(54) TRUCK BED TOOL BOX SYSTEM

(76) Inventor: Dean Alan May, 905 Vista Valley Dr., Washington, PA (US) 15301

( * ) Notice: Subject to any disclaimer, the term of this patent is extended or adjusted under 35 U.S.C. 154(b) by 0 days.

(21) Appl. No.: 10/174,604

(22) Filed: Jun. 19, 2002

(51) Int. Cl.[7] .................................................. B60R 9/00
(52) U.S. Cl. ..................... 296/37.6; 224/403; 224/281; 224/545
(58) Field of Search ............................. 296/37.6, 37.1; 224/402, 403, 404, 281, 545, 548

(56) References Cited

U.S. PATENT DOCUMENTS

| | | | | |
|---|---|---|---|---|
| 1,433,810 A | * | 10/1922 | Gibbons | 217/7 |
| 2,784,027 A | | 3/1957 | Temp | |
| 4,573,731 A | | 3/1986 | Knaack et al. | |
| 4,733,898 A | | 3/1988 | Williams | |
| 4,789,195 A | * | 12/1988 | Fletcher | 296/37.6 |
| 4,830,242 A | * | 5/1989 | Painter | 224/42.32 |
| D305,315 S | * | 1/1990 | Fletcher | D12/414.1 |
| 4,915,437 A | | 4/1990 | Cherry | |
| 5,685,593 A | | 11/1997 | O'Connor | |
| 5,848,818 A | * | 12/1998 | Flueckinger | 296/37.6 |
| 5,964,492 A | | 10/1999 | Lyon | |
| 5,996,868 A | * | 12/1999 | Paradis | 224/404 |
| 6,003,924 A | * | 12/1999 | Nicol et al. | 296/37.6 |
| 6,010,046 A | | 1/2000 | Neeser | |
| D426,187 S | * | 6/2000 | Shultz | D12/414.1 |
| 6,077,007 A | | 6/2000 | Porter et al. | |
| 6,318,780 B1 | * | 11/2001 | St. Aubin | 296/26.09 |
| 6,318,781 B1 | * | 11/2001 | Mc Kee | 296/26.09 |
| 6,422,629 B2 | * | 7/2002 | Lance et al. | 296/37.6 |
| 6,550,837 B1 | * | 4/2003 | Preiss | 296/37.6 |
| 2003/0001207 A1 | * | 1/2003 | Campbell | 296/37.6 |

* cited by examiner

*Primary Examiner*—D. Glenn Dayoan
*Assistant Examiner*—Patricia L. Engle
(74) *Attorney, Agent, or Firm*—John D. Gugliotta; Olen L. York, III

(57) ABSTRACT

A toolbox system for pickup trucks that provides toolboxes or storage units are equipped with a guide track receiving a plurality of rollers to allow them to be extended out of the tailgate of the truck bed for easy access. The invention can be used with or without a bed cap. The guide track and rollers, similar in appearance and design to a heavy duty drawer slide system, is mounted on each side of the bed near the top edge of the bed area. The toolbox or storage system with drawers, conventional in design, then moves along the gide track. The toolbox or storage system may then be moved from its stowage position behind the cab area, by releasing a locking mechanism and sliding the toolbox to the rear of the bed. There, tools and other items can easily be removed without climbing into the bed area.

7 Claims, 5 Drawing Sheets

TRUCK BED TOOL BOX SYSTEM

RELATED APPLICATIONS

The present invention was first described in Disclosure Document Registration 496,082 filed on Jun. 28, 2001 under 35 U.S.C. §122 and 37 C.F.R. §1.14. There are no previously filed, nor currently any co-pending applications, anywhere in the world.

BACKGROUND OF THE INVENTION

1. Field of the Invention

The present invention relates generally to vehicle storage organizers and, more particularly, to a truck bed organizer system.

2. Description of the Related Art

With sales at an all-time high, the popularity of the pick-up style truck as an everyday vehicle is more widespread than it ever has been. Their utility and convenience in hauling items coupled with the availability of luxury interiors and extended cab space have made the pickup a popular alternative to other vehicles. The availability of aftermarket accessories also enhances the attractiveness of pickup trucks as well. Perhaps one of the most common accessories is that of the "behind-the-cab" type toolbox, for carrying tools and other smaller objects. However, accessing the toolbox is often a problem for many due to the height and depth limitations from only being able to reach the contents from the side of the truck. Many people are forced to climb up into the truck to reach the items located at the middle of the toolbox.

Consequently, the need has arisen for a means by which tools materials and other items stored in the bed of a pickup truck can be accessed in an easier manner with minimal effort.

SUMMARY OF THE INVENTION

It is therefore an object of the present invention to provide an improved vehicle storage organizer.

It is a feature of the present invention to provide an improved truck bed organizer system.

Briefly described according to one embodiment of the present invention, a toolbox system for pickup trucks that provides toolboxes or storage units are equipped with a rolling track system to allow them to be extended out of the tailgate of the truck bed for easy access. The invention can be used with or without a bed cap. The rolling track system, similar in appearance and design to a heavy duty drawer slide system is mounted on each side of the bed near the top edge of the bed area. The toolbox or storage system with drawers, conventional in design, then rides on the roller track system. The toolbox or storage system may then be moved from its stowage position behind the cab area, by releasing a locking mechanism and sliding the toolbox to the rear of the bed. There, tools and other items can easily be removed without climbing into the bed area.

The use of the present invention allows pickup truck users the ability to store tools and other items in a conventional style toolbox in the bed of the pickup truck, but yet allows ease of access to the toolbox from a grade position at the tailgate area of the truck bed in a manner which is quick, easy and effective.

It is therefore an object of the present invention to provide a cargo space divider that allows a pick-up truck bed or the like to be sectioned-off into smaller confined spaces for transporting smaller items in a safe and secure manner.

It is another object of the present invention to provide a cargo space divider that incorporates the use of dividing walls that section the cargo area in both the longitudinal and lateral dimensions.

It is another object of the present invention to provide a cargo space divider having lateral dividing walls that are capable of being positioned variably along the length of the cargo area, spanning its width.

It is another object of the present invention to provide a cargo space divider having lateral dividing walls that adjust telescopically so as to allow for installation in cargo areas of varying widths.

It is another object of the present invention to provide a cargo space divider having longitudinal dividing walls that connect to a pair of adjacent lateral dividing walls, spanning there between.

It is another object of the present invention to provide a cargo space divider having longitudinal dividing walls that adjust telescopically so as to allow for connection between a pair of adjacent lateral dividing walls being of varying relative spacing.

It is another object of the present invention to provide a cargo space divider that is easy to install and is adjustable so as to fit cargo spaces of varying size.

It is another object of the present invention to provide a cargo space divider that is sturdy in both construction and installation, providing a stable load support for items carried therein.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 7-B is an exploded perspective of a bed fastener shown in an attached position to the bottom wall of the vehicle storage organizer, while remaining detached from bed surface of a vehicle.

DETAILED DESCRIPTION OF THE PREFERRED EMBODIMENT

1. Detailed Description of the Figures

Figure 1:
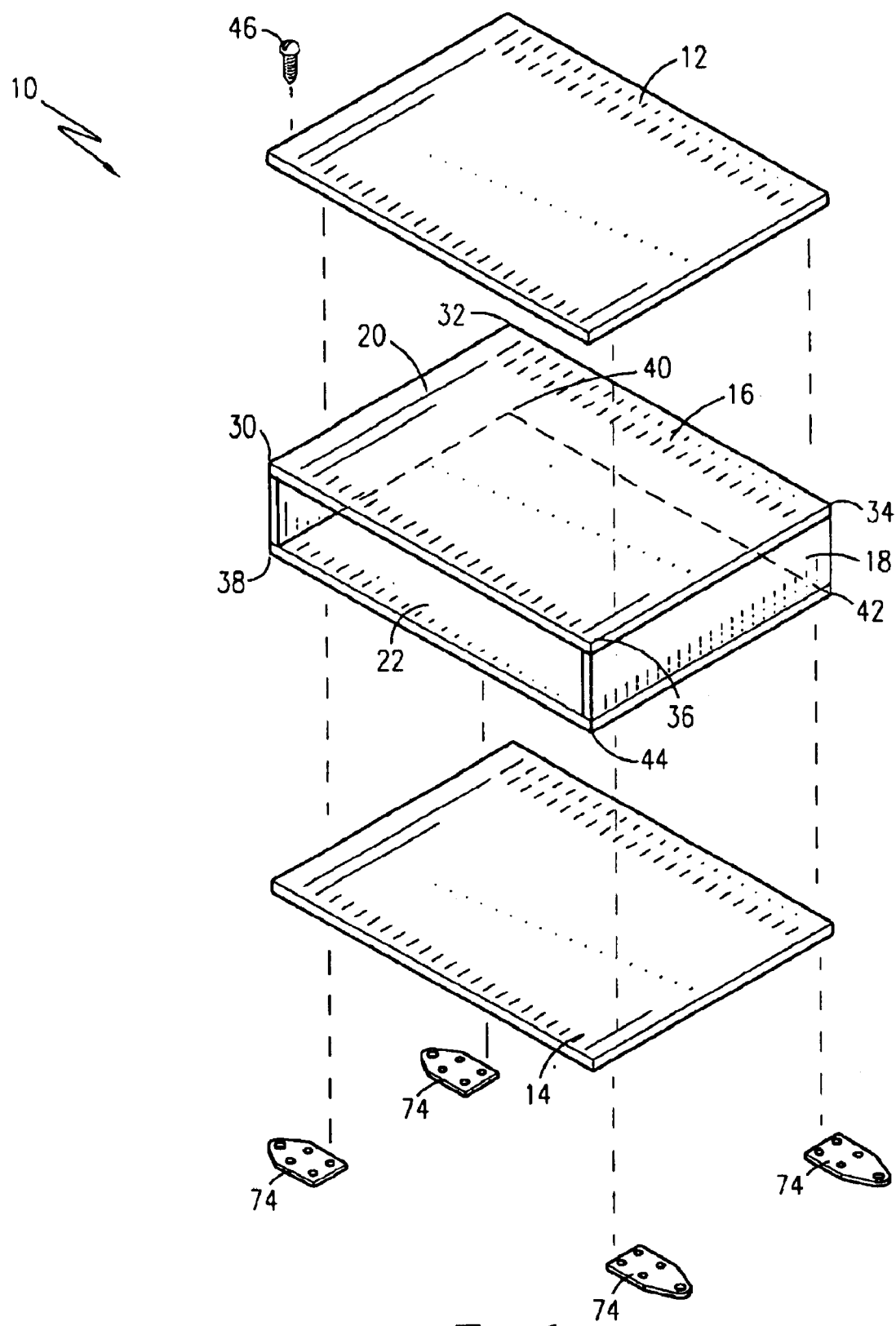
FIG. 1 is an exploded perspective of a vehicle storage organizer in which the frame components are detached.
Figure 2:
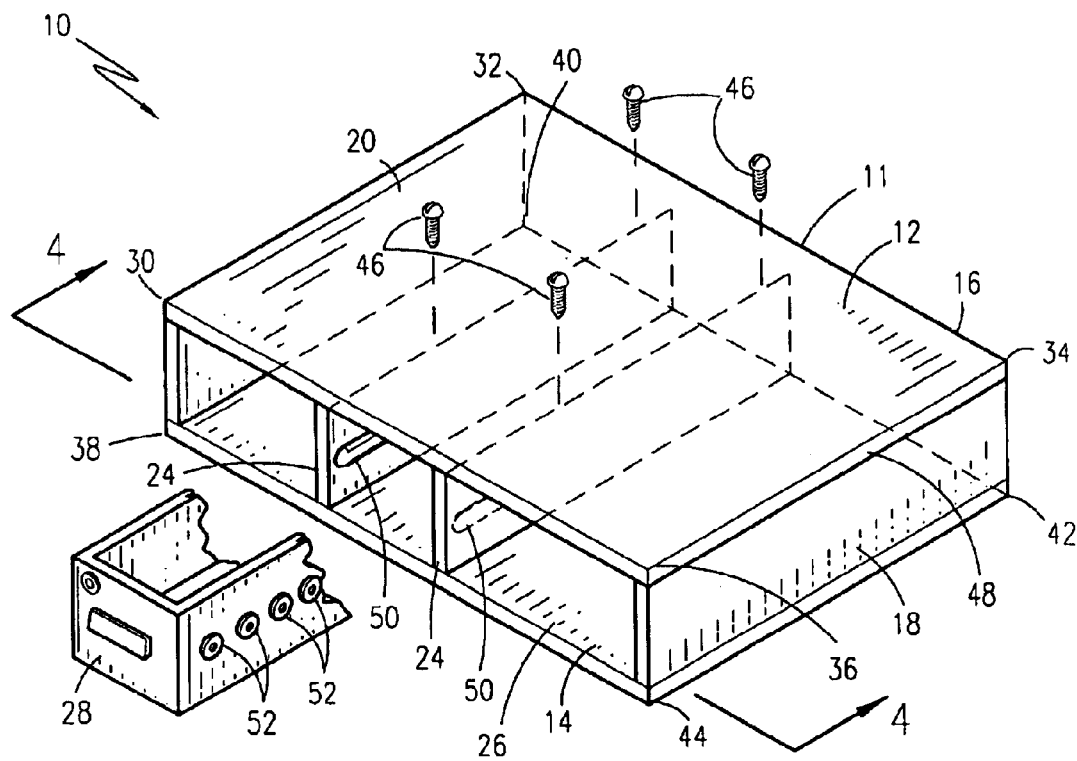
FIG. 2 is an exploded perspective of the apparatus of FIG. 1 in which the frame components are attached and illustrating a single storage drawer and its varied components.

Referring now to FIG. 1 and FIG. 2, a vehicle storage organizer 10 is shown, in accordance with the present invention, comprising a rectangular frame 11 that is deeper than its width and includes a top wall 12 and a bottom wall 14 each perpendicularly depending from a rear wall 16 and two opposable side walls 18 and 20 and forming a drawer area 22. A plurality of divider walls 24 are placed within the drawer area 22 and fixedly attached to the top wall 12 and bottom wall 14 to form individualized storage compartments 26 capable of housing storage drawers 28. The vehicle storage organizer 10 is preferably manufactured from a durable material, such as plastic, metal, or treated wood products, to withstand the typical use endured by a storage device.

The top wall 12 is fixedly attached to the rear wall 16 and the side walls 18 and 20 by an attachment means 46, such as a screw, nail or other suitable means, at the points 30, 32, 34, and 36. The bottom wall 16 is fixedly attached to the rear wall 16 and the side walls 18 and 20 by an attachment means 46, such as a screw of nail or other suitable means, at the points 38, 40, 42, and 44. A suitable sealing means 48 (not shown), such as silicon caulking or adhesive weather stripping, is placed along the edge portion of where the top wall 12 rests on the rear wall 16 and the side walls 18 and 20, thus sealing the wall junctions from point 30 to 32, from point 32 to 34, and from point 34 to 36. A suitable sealing means 48 (not shown) is also placed along the edge portion of where the bottom wall 14 supports the rear wall 16 and the side walls 18 and 20, thus sealing the wall junctions from point 38 to 40, from point 40 to 42, and from point 42 to 44. The sealing means 48 (not shown) acts to seal the drawer area 22 from moisture and other outside debris and to add structural integrity to the rectangular frame 11. A plurality of bed fasteners 74 may be used to secure the bottom wall 14 to the bed surface 72 of a vehicle.

Figure 3:
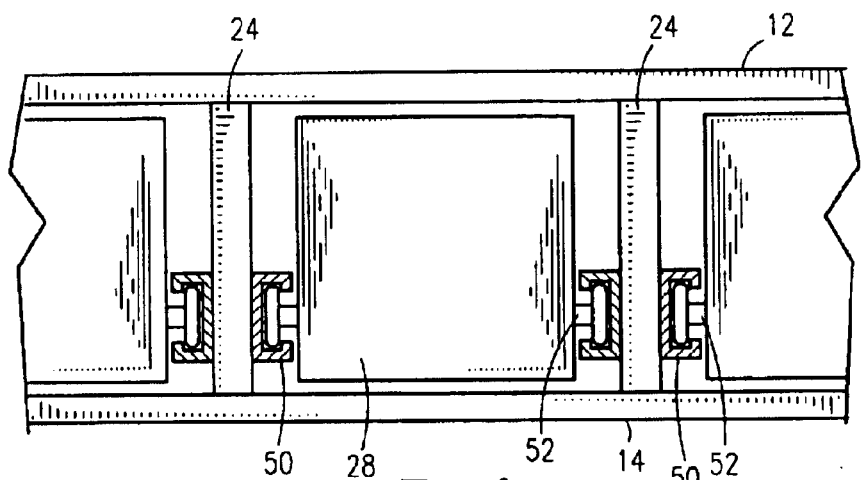
FIG. 3 is a front view of the apparatus of FIG. 2 in which the front face of the storage drawer is absent to illustrate the spatial arrangement and relationship among the divider walls, the guide track and the rollers.
Figure 4:
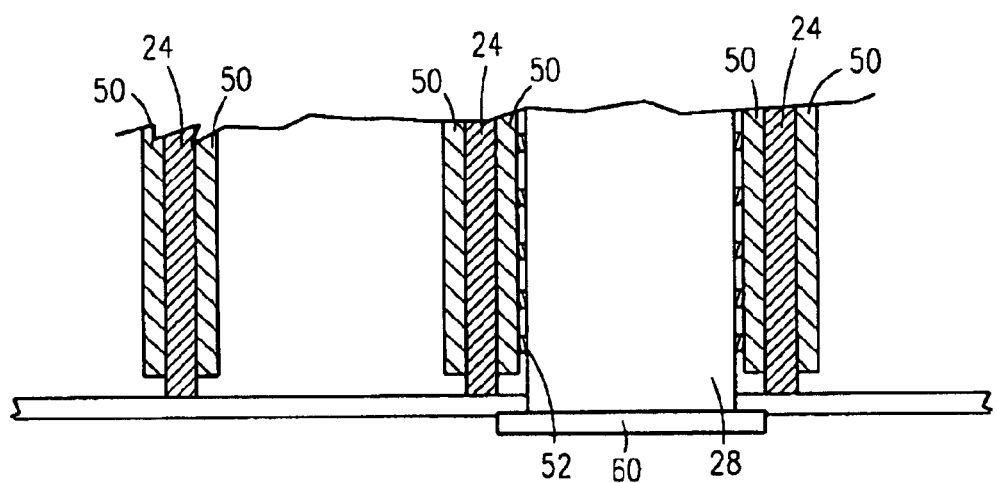
FIG. 4 is a cross-sectional view of the apparatus of FIG. 2 and FIG. 3, and taken through line 4—4 of FIG. 2, in which a single storage drawer is shown with the rollers engaged with the guide tracks.
Figure 5:
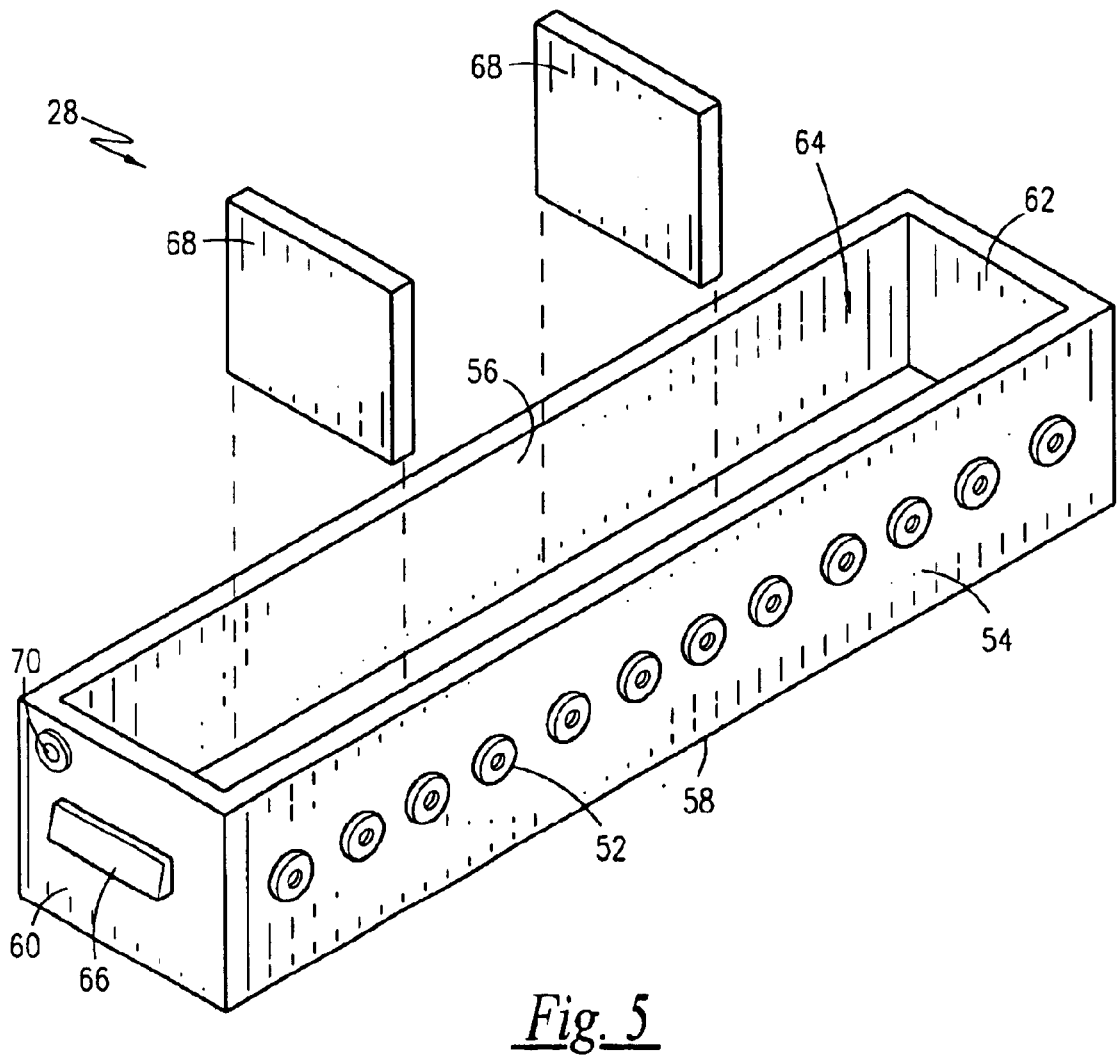
FIG. 5 is an exploded perspective of a storage drawer and illustrating the placement of the rollers and drawer dividers.

Referring now to FIG. 2 and FIG. 3, the divider walls 24 are placed within the storage area 22 in an arrangement parallel to the side walls 18 and 20 and fixedly attached to the top wall 12, the bottom wall 14 and the rear wall 16 by a plurality of attachment means 46. Each divider wall 24 houses a pair of C-shaped guide tracks 50 positioned along the lower portion, but on opposite sides, of the divider wall 24 and extends linearly from the front to the back of the divider wall 24. The two side walls 18 and 20 each house a single guide track 50 along the inner portion of the side walls 18 and 20 and extend linearly from the front to the back of each side wall 18 and 20. The guide track(s) 50 are capable of receiving a plurality of rollers 52 housed on the storage drawer 28, thus allowing the storage drawer 28 to smoothly open and close. Optionally, the guide track(s) 50 may be housed along the lower side portion of the storage drawer 28 and the rollers may be housed along the lower portion of the side walls 18 and 20 and the divider walls 24.

A storage drawer 28 includes a pair of opposable drawer side walls 54 and 56 each perpendicularly depending from a drawer base 58 and a front face 60 and a rear wall 62, and which form to define a storage area 64. The opposable drawer side walls 54 and 56 each have a plurality of rollers 52 located on the lower portion of the outside of the drawer side walls 54 and 56, and which align with the guide track(s) 50 located on the frame side walls 18 and 20 or the divider wall(s) 24. The rollers 52 slidably move along the guide track(s) 50 as the storage drawer 28 is opened or closed. The front face 60 houses a drawer handle 66 to provide a convenient means for grasping the storage drawer 28 for opening and closing. A plurality of drawer dividers 68 may be fixedly attached, by an attachment means 46, to the storage drawer side walls 54 and 56 to further divide and compartmentalize an individual storage drawer 28 for specified storage needs. The front face 60 of the storage drawer 28 also houses a keyed lock 70, providing a means for securely protecting the storage contents from theft.

Figure 6:
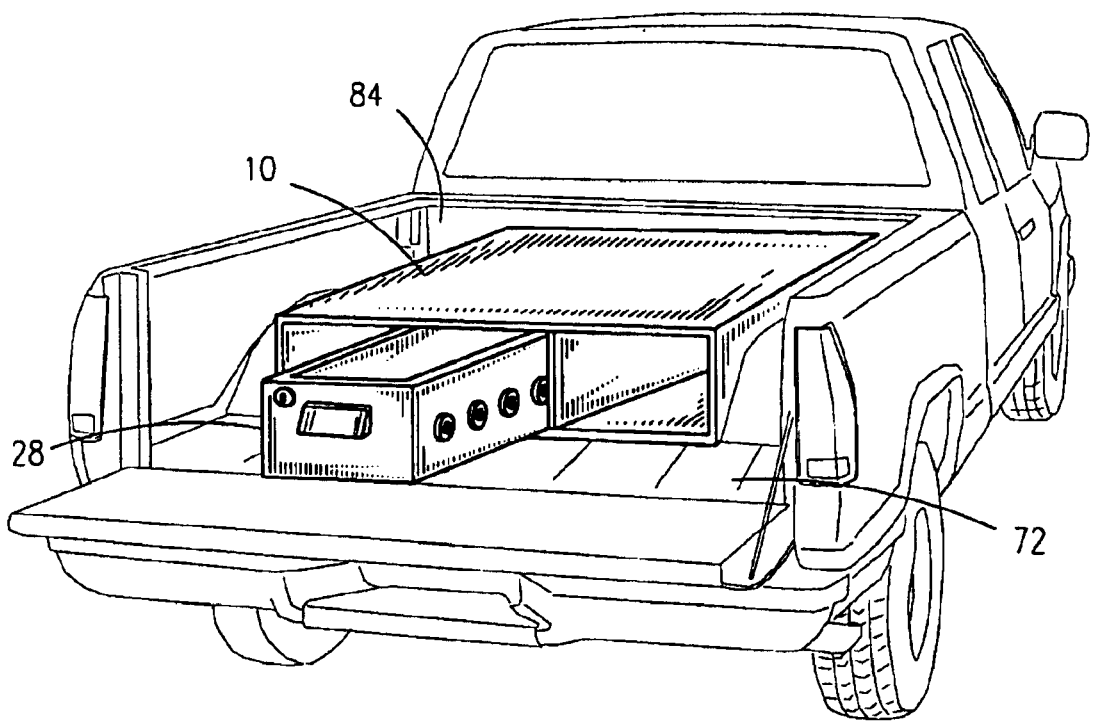
FIG. 6 is an exploded perspective of the apparatus of FIG. 1 positioned within the bed of a typical truck.
Figure 7A:
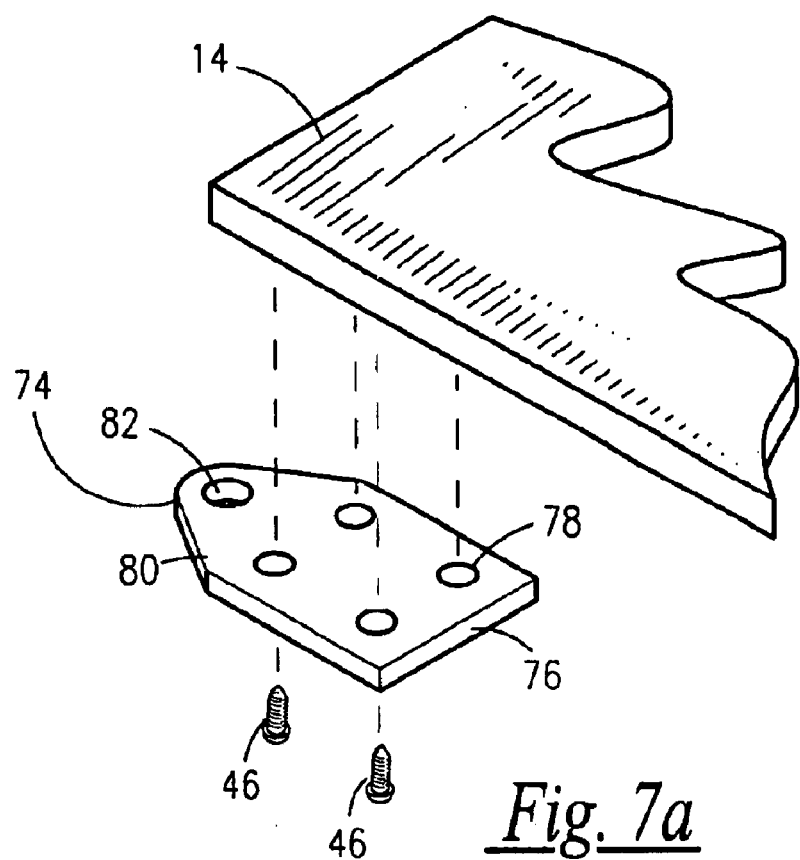
FIG. 7-A is an exploded perspective of a bed fastener shown in a detached position.
Figure 7B:
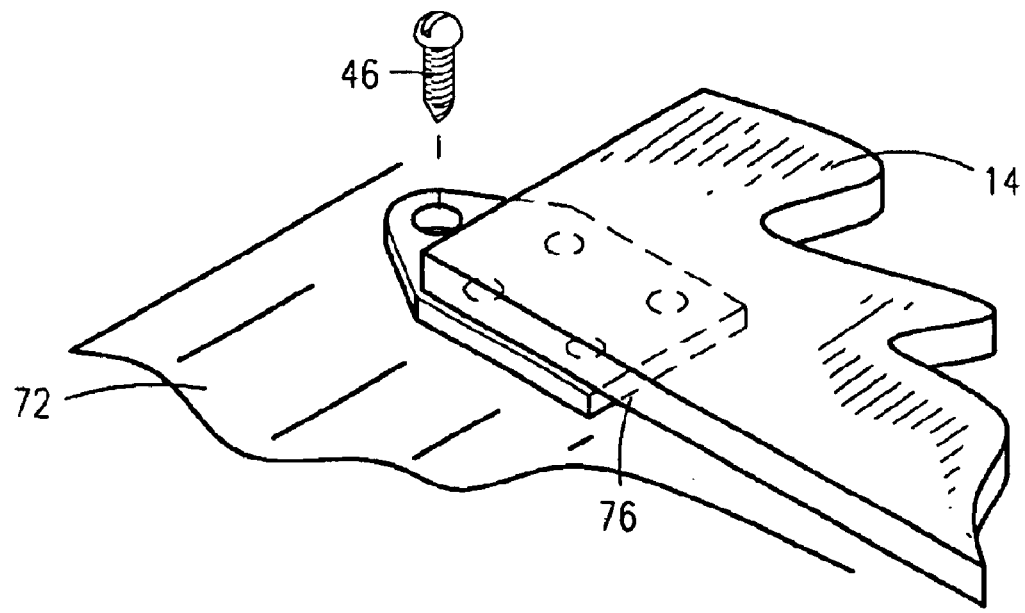

Now referring to FIG. 7-A and FIG. 7-B, a bed fastener 74 is shown comprising a base plate 76 housing a plurality of attachment holes 78 and a bell-shaped lip 80 with a single attachment hole 82. The bed fastener 74 is fixedly attached to the bottom wall 14 of the vehicle storage organizer 10 to the vehicle bed surface 72 by driving an attachment means 46 through the attachment holes 78 and into the bottom wall 14. Then, the vehicle storage organizer 10, as a unit, may be securely fastened to the vehicle bed surface 72 by driving another attachment means 46 through the bell-shaped lip 80 (via the corresponding attachment hole 82) and into the vehicle bed surface 72. This arrangement allows the vehicle storage organizer 10 to remain securely in place and prevent the vehicle storage organizer 10 from sliding and banging against the inside of the vehicle bed area 84 (see FIG. 6).

2. Operation of the Preferred Embodiment

To assemble the vehicle storage organizer 10, a user will apply a sealing means 48, such as silicone caulking or weather stripping, along the edges directed from point 38 to 40, from point 40 to 42, and from point 42 to 44 along the bottom wall 14. Then, the user will position the rear wall 16 or one of the side walls 18 or 20 along the appropriate edge of the bottom wall 14 and attach the corresponding wall 16, 18 or 20 with a plurality of attachment means 46 to the bottom wall 14. This process is repeated twice more and results in three walls 16, 18 and 20 perpendicularly attached to the bottom wall 14. Any excess sealing means 48 should be cleaned up and disposed of.

Another application of a sealing means 48 is applied along the edges directed from point 30 to 32, from point 32 to 34, and from point 34 to 36. The top wall 12 is positioned so as to rest perpendicularly to the three walls 16, 18 and 20, with the top wall 12 fixedly attached by a plurality of attachment means 46. Again, any excess sealing means 48 should be cleaned up and disposed of.

A divider wall 24 is placed within the now formed drawer area 22 and fixedly attached by a plurality of attachment means 46 to the top wall 12, the bottom wall 14 and the rear wall 16. The user should make sure to position the divider wall 24 so that the guide track 50 is positioned near the surface of the bottom wall 14 so that the guide track 50 and the rollers 52 align properly. The placement of a second divider wall 24 is repeated as with the first placement at the desired width of the storage drawer 28. This process is repeated until the user is satisfied with the number of drawer areas 22 available.

At this point, the user should attach the bed fasteners 74 to the bottom wall 14 and prepare to attach the vehicle storage organizer 10 to the bed surface 72 of the vehicle. The user will attach one bed fastener 74 to one corner of the bottom wall 14 by driving a plurality of attachment means 46 through the attachment holes 78 of the base plate 76 and into the bottom wall 14, making sure to position the bell-shaped lip 80 to the outside of the frame 11. This process is repeated three more times and results in each corner of the bottom wall 14 housing a bed fastener 74. The user will drive an attachment means 46 through the attachment hole 82 and into the vehicle bed surface 72 until each bed fastener 74 is securely attached and preventing the vehicle storage organizer 10 from sliding out of position.

The storage drawer 28 is assembled by fixedly attaching the front face 60 to the drawer side walls 54 and 56 and the drawer base 58 through a plurality of attachment means 46, with the user making sure to position the drawer side walls 54 and 56 so that the rollers 52 are near the surface of the bottom wall 14 so that the rollers 52 properly align with the guide tracks 50. The user should also make sure to position the front face 60 so the keyed lock 70 opening faces the outside of the frame 11. The user then will fixedly attach the drawer rear wall 62 to the side walls 54 and 56 and the drawer base 58 through a plurality of attachment means 46. The user then will fixedly attach the desired number of drawer dividers 68 within the storage area 64 through a plurality of attachment means 46 driven through the side walls 54 and 56. The assembled storage drawer 28 is aligned in such a way that the rollers 52 slidably engaged the guide track 50. Additional storage drawers 28 may be assembled by repeating the aforementioned process.

The user will then store any desired items within the storage drawers 28. After storage, the storage drawer 28 is pushed toward the frame 11 to close the vehicle storage organizer 10. The user may then lock the storage drawer 28 by pressing the keyed lock 70 into a depressed position, or optionally by turning the keyed lock 70 into a "locked" position. To unlock the storage drawer 28, a user would insert a key into the keyed lock 70 and turn the key until the keyed lock 70 is unlocked.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

What is claimed is:

1. A vehicle storage organizer comprising:
    a rectangular frame that has a depth gzreater than a width and includes a top wall and a bottom wall each perpendicularly depending from a rear wall and two opposable side walls forming a drawer area;
    a plurality of divider walls placed within said drawer area and fixedly attached to said top wall and said bottom wall to form a plurality of individualized storage compartments capable of housing storage drawers;
    a plurality of storage drawers, each of said plurality of storage drawers insertable between said plurality of divider walls and within said individualized storage compartments, and each of said plurality of storaze drawers selectively opened and closed, and wherein said plurality of storage drawers number at least three storage drawers; and
    plurality of bed fasteners to secure said bottom wall to a bed surface of a vehicle, each one of said bed fasteners comprising a plate and having a plurality of attachment holes, wherein at least one of said plurality of attachment holes secures said plate to said bed surface, and remainder of said plurality of attachment holes secures said plate to said bottom wall.

2. The vehicle storage organizer of claim 1, wherein said frame and said divider walls are selected from the group consisting of plastic, metal, and treated wood products.

3. The vehicle storage organizer of claim 1, wherein:
    said top wall is fixedly attached to said rear wall and said side walls by an attachment means; and
    said bottom wall is fixedly attached to said rear wall and said side walls by said attachment means.

4. The vehicle storage organizer of claim 3, further comprising:
    sealing means placed along an edge portion of where said top wall rests on said rear wall and said side walls, said sealing means selected from the group consisting of caulking and weather stripping; and
    said sealing means also placed along an edge portion of where said bottom wall supports said rear wall and said side walls;
    whereby said sealing means acts to seal said drawer area from moisture and other outside debris and to add structural integrity to said rectangular frame.

5. The vehicle storage organizer of claim 3, wherein:
    each divider wall houses a pair of C-shaped guide tracks positioned along a lower portion, but on opposite sides, of said divider wall and extends linearly from a front to a back of the divider wall; and
    said two side walls each house a single guide track along an inner portion of the side walls and extend linearly from the front to the back of each side wall;
    said guide tracks being capable of receiving a plurality of rollers housed on the storage drawer, thus allowing the storage drawer to smoothly open and close.

6. The vehicle storage organizer of claim 1 further comprising a plurality of drawer dividers for compartmentalizing each of said plurality of drawers.

7. The vehicle storage organizer of claim 1, wherein each one of said plurality of drawers comprises:
    a pair of opposable drawer side walls, each of said pair of opposable drawer side walls depending from a drawer base coextensive to said bottom wall;
    a drawer rear wall depending from said base and said pair of opposable drawer side walls;
    a front face, opposite to said drawer rear wall, said front face comprising a handle for grasping one of said plurality of drawers; and
    a key lock provided on said front face, said key lock for securing storage contents of one of said plurality of drawers.

* * * * *